United States Patent [19]

Connors et al.

[11] 4,202,042
[45] May 6, 1980

[54] DIGITAL TO ANALOG INTERFACE FOR SIMULTANEOUS ANALOG OUTPUTS

[75] Inventors: John P. Connors, Silver Spring, Md.;
Bernard J. Nordmann, Bronx, N.Y.;
David M. Wainland, Cardiff, N.J.;
Henry P. Bell, Laurel, Md.

[73] Assignee: The United States of America as represented by the Secretary of the Navy, Washington, D.C.

[21] Appl. No.: 813,038

[22] Filed: Jul. 5, 1977

[51] Int. Cl.$^2$ .......................................... H03K 13/175
[52] U.S. Cl. ............................. 364/900; 340/347 DA
[58] Field of Search ... 364/200 MS File, 900 MS File, 364/200, 900; 340/347 M, 347 DA

[56] References Cited

U.S. PATENT DOCUMENTS

| | | | |
|---|---|---|---|
| 3,469,253 | 9/1969 | Hunt | 340/347 M |
| 4,003,083 | 1/1977 | Gariazzo | 360/29 |
| 4,062,013 | 12/1977 | Nagahama | 360/347 DA |

OTHER PUBLICATIONS

Analog—Digital Conversion Handbook by the Engineering Staff of Analog Devices, Inc., edited by Daniel H. Sheingold, published by Analog Devices Inc., Norwood Mass., 02062, USA, copyright, 1972, pp. I-45, I-46, II-44, II-46.

Primary Examiner—Gareth D. Shaw
Assistant Examiner—C. T. Bartz
Attorney, Agent, or Firm—R. S. Sciascia; A. L. Branning

[57] ABSTRACT

Interface circuitry for obtaining simultaneous, multichannel analog outputs from a microprocessor, avoiding sequential addressing delays. The technique involves inserting, for each analog output channel, a buffer latch between the data bus lines from the microprocessor and the D/A latch associated with the D/A converter. The buffer latches are sequentially addressed by control logic circuitry and loaded from the computer memory in accordance with software instructions in the microprocessor. While data is being loaded in the buffer latches, the D/A latches are disabled, preventing the data from being presented to the D/A converters. When all channels are loaded, the D/A latches are strobed simultaneously, enabling them and transferring the data stored in the buffer latches to the D/A converters for conversion to analog outputs.

1 Claim, 2 Drawing Figures

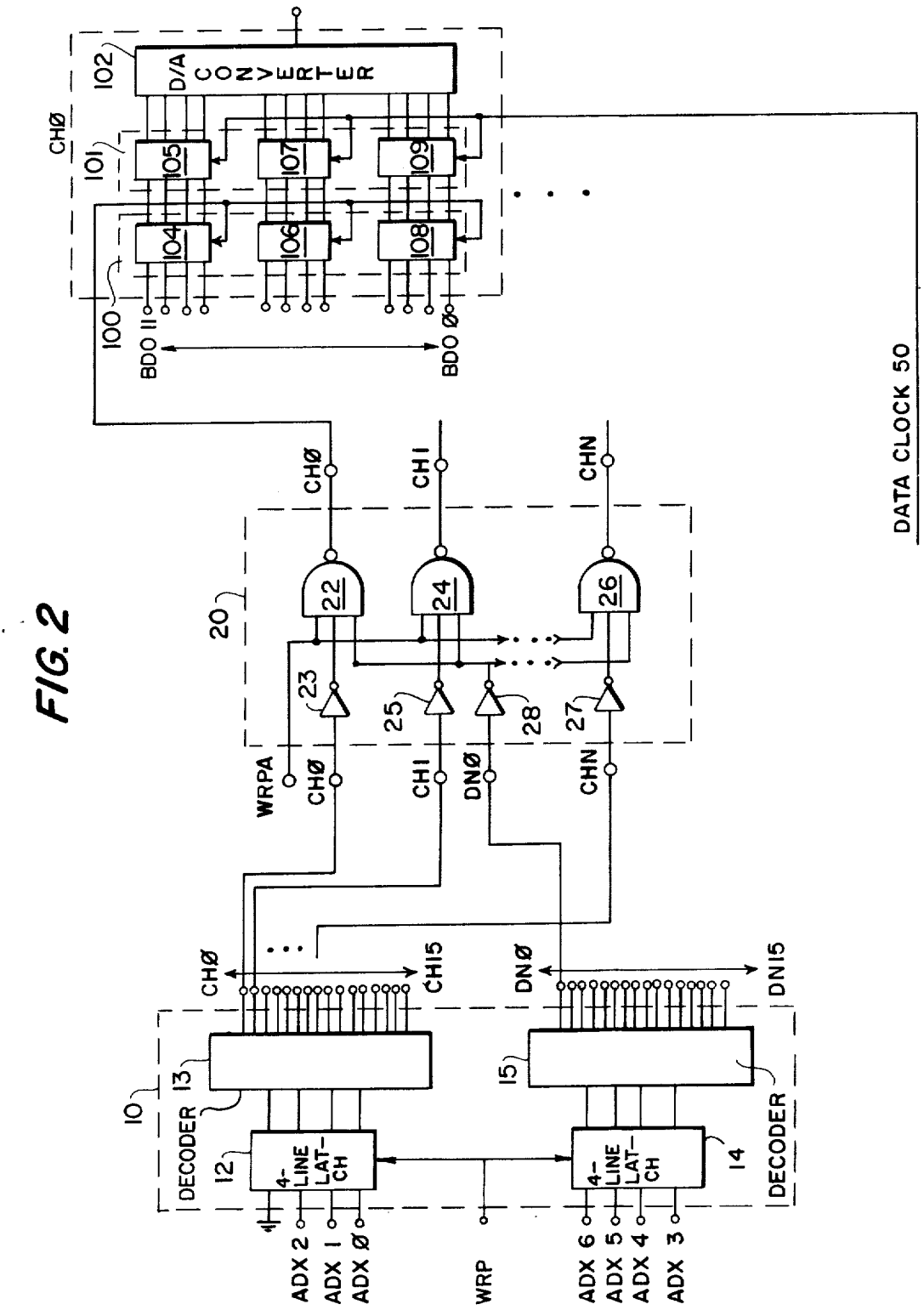

DIGITAL TO ANALOG INTERFACE FOR SIMULTANEOUS ANALOG OUTPUTS

BACKGROUND OF THE INVENTION

The present invention relates to digital interface systems for interfacing microprocessors to digital-to-analog converters and more particularly to such a system wherein multi-channel, simultaneous analog outputs can be obtained, avoiding sequential addressing delays.

In many microprocessor applications, the microcomputer is required to supply more than one output channel. In analog applications where digital information from the microcomputer must be converted to multi-channel analog outputs, interfacing circuitry is added between the microprocessor and the digital-to-analog converter for each output channel. Straightforward multiplexing techniques include interface circuitry comprising a data latch for each channel, i.e., for each D/A converter, and a control logic circuit for sequentially addressing the different channels. Under software control, the microcomputer enables and loads the latch associated with a particular output channel. The "latched" digital information is simultaneously presented to the corresponding D/A converter. Inherent in such an interfacing technique, however, are sequential addressing delays with respect to the various output channels. Thus, if it is desired to obtain multi-channel, simultaneous analog outputs (to control a set of servo-actuators, for instance), the straightforward multiplex technique will not perform the task.

SUMMARY OF THE INVENTION

It is therefore an object of the present invention to provide a digital interface circuit which will enable a microprocessor to supply multi-channel, simultaneous analog outputs.

Accordingly to accomplish these and other objects the present invention provides a digital interface circuit, coupled between a microprocessor and the digital-to-analog converters associated with a plurality of output channels, for enabling the microprocessor to supply simultaneous, multi-channel analog outputs. The data processing system comprises a microprocessor, a D/A converter for each of the two or more output channels and interfacing digital circuitry. The digital interface circuitry comprises a decoder logic circuit, a control logic circuit and, for each of the output channels, buffer latches and D/A latches. The decoder logic circuit is coupled to the address bus of the microprocessor and functions to decode the channel-address instructions from the computer software. The control logic circuit is coupled to each of the buffer latches, sequentially addressing the output channels in accordance with the decoded channel-address instructions. When a particular output channel is addressed, the relevant buffer latch is enabled by the control logic circuit and data is loaded via the data bus of the microprocessor. While the output channels are being loaded, the D/A latches, coupled between the buffer latches and the D/A converters, are disabled preventing the transmittal of the data to the D/A converters. When all of the buffer latches are loaded, the D/A latches are strobed, simultaneously enabling them. This effects the transmittal of the data "latched" in the buffer latches to the D/A converters.

The novel features believed to be characteristic of the present invention are set forth in particularity in the appended claims. However, a more complete appreciation of the present invention, both as to organization and mode of operation, and many of the attendant advantages thereof will be realized as the same becomes better understood by reference to the following detailed description when considered in conjunction with the accompanying drawings.

BRIEF DESCRIPTION OF THE DRAWINGS

FIG. 2 is a schematic circuit diagram of the digital interface circuitry including the decoder logic circuit, the control logic circuit and a representative output channel according to the present invention.

DESCRIPTION OF THE PREFERRED EMBODIMENT

Figure 1:
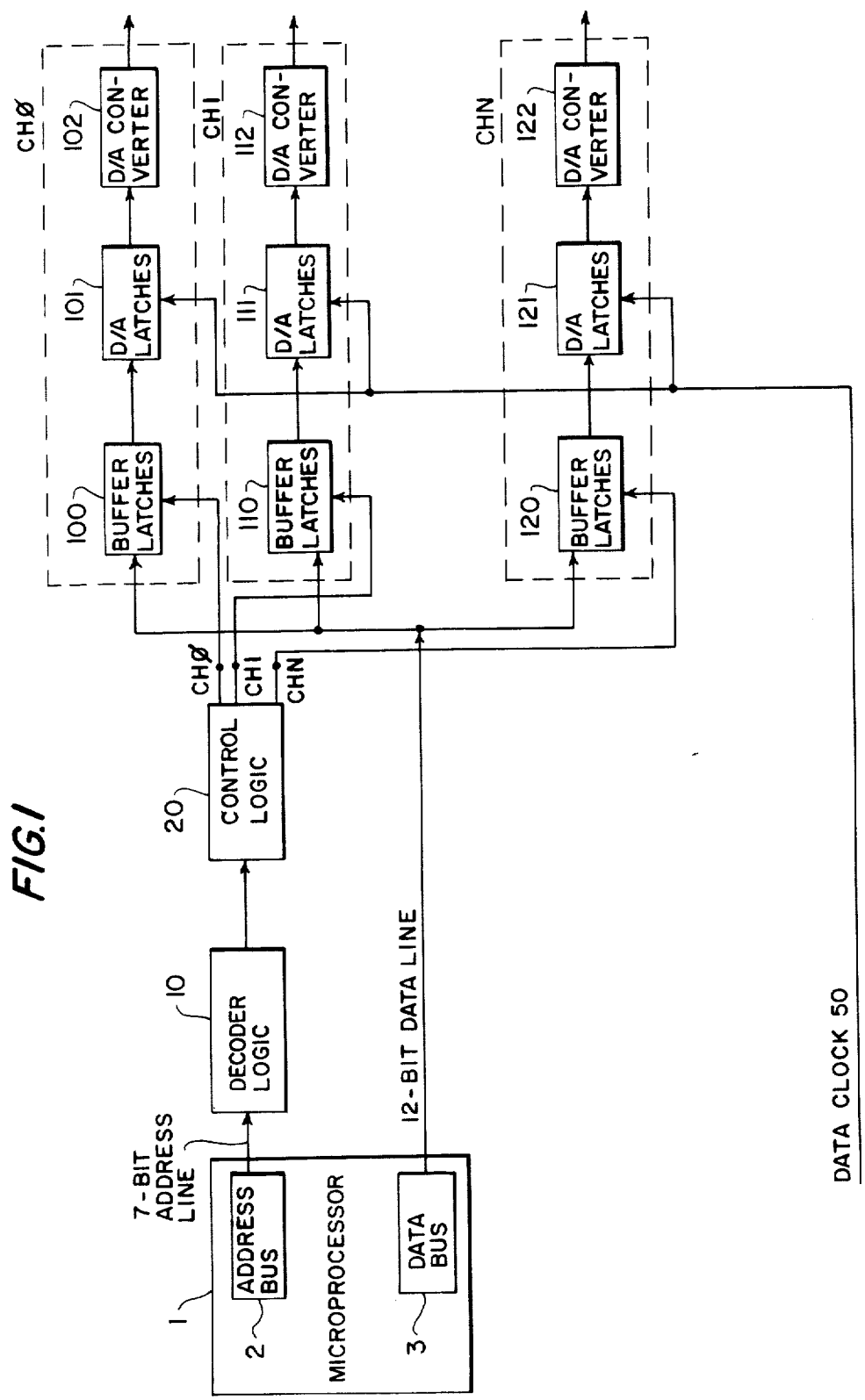
FIG. 1 is a block diagram of the data processing system, together with the digital interface circuitry for obtaining simultaneous multi-channel outputs, in accordance with the present invention.

Referring now to the drawings wherein like reference characters designate like or corresponding elements in both views, the block diagram in FIG. 1 shows a microprocessor 1 having an Address Bus 2 and a Data Bus 3. Address Bus 2 is coupled to a decoder logic circuit 10 which, in turn, is coupled to a control logic circuit 20.

Control logic circuit 20 has N output lines (denominated CH$\phi$, CH1, . . . CHN), one for each of the N output channels represented by the block diagram in FIG. 1. Each output channel comprises, in coupling sequence, buffer latches, D/A latches and a digital-to-analog converter. The term "latch" is used in the accepted sense in the digital computer art as a storage device for storing a single binary digit, generally a dual output representing the bits stored and the complement of the stored bit (Q and $\overline{Q}$), a clear input and an enabling or clocking input. The N output channels are represented in FIG. 1 by output channels designated CH$\phi$, CH1 and CHN. Output channel CH$\phi$ comprises a plurality of buffer latches 100, a plurality of D/A latches 101 and a D/A converter 102. Output channel CH1 comprises a plurality of buffer latches 110, a plurality of D/A latches 111 and a D/A converter 112. Output channel CHN comprises a plurality of buffer latches 120, a plurality of D/A latches 121 and a D/A converter 122. The N outputs of control logic circuit 20 are coupled to these N output channels as follows. The CH$\phi$ output of control logic circuit 20 is coupled to the enable inputs of buffer latches 100. Similarly, the CH1 output of the control logic circuit 20 is coupled to the enable inputs of buffer latches 110 and the CHN output is coupled to the enable inputs of buffer latches 120.

The above described configuration couples the Address Bus 2 of the microprocessor to the N buffer latches, and, consequently, to the N output channels. As will be described below, the N output channels are sequentially addressed, and the N buffer latches sequentially enabled, in accordance with software instructions transmitted via Address Bus 2 and decoder logic circuit 10 to control logic circuit 20.

Data Bus 3 is coupled to each of the N buffer latches associated with the N output channels. Thus, in FIG. 1, Data bus 3 is coupled to buffer latches 100, 110 and 120. This permits data from the computer memory of microprocessor 1 to be transmitted via Data Bus 3 to the N output channels for conversion into analog output information.

Finally, a data clock line 50 is coupled to each of the N D/A latches associated with the N output channels. Thus, in FIG. 1 data clock line 50 is coupled to the enable inputs of D/A latches 101, 111 and 121. As will be discussed below, this configuration permits the N D/A latches to be simultaneously enabled independently of the sequential enabling of the N buffer latches.

In the preferred embodiment, microprocessor 1 can be any commercially available microprocessing unit such as the IMP-16 manufactured by National Semiconductor (Santa Clara, Calif.). The IMP-16 utilizes a 16-bit word where the term "word" is used in the accepted sense in the digital computer art as a set of characters or bits (binary digits), which is treated as a unit. Correspondingly, the IMP-16 features a 16-line address output bus and a 16-line data output bus. However, the ensuing discussion of the preferred embodiment is based on a 7-bit address word and a 12-bit data word. Thus, in FIG. 1 Address Bus 2 embodies a 7-line output and Data Bus 3 embodies a 12-line output. Of course, the data processing system could be readily expanded to utilize up to a 16-bit word for both address and data outputs.

Decoder logic circuit 10, control logic circuit 20 and the CH$\phi$ output channel associated with control logic circuit 20 are shown in greater detail in FIG. 2. As will be discussed below, the function of decoder logic circuit 10 is to decode a 7-bit address word, rotated via Address Bus 3, so as to identify a particular device and the particular output channel of that device which is to be addressed. The term "device" is used to indicate a peripheral unit comprising a control logic circuit with N output channels. In the 7-bit address word (bits $\phi$ to 6) of the preferred embodiment, bits 3 to 6 are allocated to identify the peripheral unit, permitting up to sixteen (0000 to 1111) devices. FIGS. 1 and 2 show only one such device, i.e., that represented by control logic circuit 20. Expansion to multiple devices would be analogous, however; hence, the ensuing discussion is limited to this single device.

As shown in FIG. 2, decoder logic circuit 10 comprises two 4-line latches 12 and 14 and two 4 and 16-line (4-line input, 16-line output) decoders 13 and 15. Decoders 13 and 15 are each a digital device which, in response to the input of a given 4-bit word, will provide an output level to the one of its 16 outputs corresponding to that particular binary code. The 4-line latch 12 is coupled to the 4-line input of decoder 13 while the 4-line latch 14 is coupled to the 4-line input of decoder 15. Finally, an internal clock line WRP is coupled to the enable input of each of the two latches. The eight total inputs of the two 4-line latches 12 and 14 comprises the inputs of decoder logic circuit 10. The 7-line Address Bus 2 (not shown in FIG. 2) is coupled to seven of these inputs with the eighth input being grounded. The seven ungrounded inputs to decoder logic circuit 10 correspond to the 7 bits($\phi$ to 6) of the address word. The three ungrounded inputs of latch 12 correspond to bits $\phi$ to 2 and are denominated ADX$\phi$, ADX1 and ADX2. The four inputs of latch 14 correspond to bits 3 to 6 and are denominated ADX3, ADX4, ADX5 and ADX6.

The outputs of decoder logic circuit 10 comprise the 32 outputs of the two 16-line-output decoders 13 and 15. As noted above, bits 3 to 6 of the address word are allocated to identify a device number, i.e., control logic circuit 20; thus, latch 14 (ADX3 to ADX6) and, consequently, decoder 15 are associated with decoding the portion of the address word allocated to the device member. Thus, the 16 outputs of decoder 15 are designated DN$\phi$, DN1, DN2, . . . DN15. The remaining 3 bits of the address word, $\phi$ to 2, are allocated, in the preferred embodiment, to identifying the particular output channel of a device, up to a total of eight (000 to 111) channels, of the device indicated by bits 3 to 6. Thus, latch 12 (ADX$\phi$ to ADX2) and, consequently, decoder 13 are associated with decoding the portion of the address word allocated to the output channel selection. Thus, the 16 outputs of decorder 13 are denominated CH$\phi$, CH1, CH2 . . . CH15 (only Ch$\phi$ to CH7 being relevant in this discussion).

Control logic circuit 20 comprises a series of NAND gates, represented in FIG. 2 by a first NAND gate 22, a second NAND gate 24 and an Nth NAND gates 26. The inputs to control logic circuit 20 are indicated in FIG. 2 as a WRPA input, a DN$\phi$ input and N inputs denominated CH$\phi$, CH1, . . . CHN. The WRPA input is an internal clockline input and is coupled to an input of each of the NAND gates. The DN$\phi$ input is coupled through an inverter 28 to a second input of each of the NAND gates. The N inputs denominated CH$\phi$, CH1, . . . CHN are each coupled through a respective inverter to a third input of a respective NAND gate. Thus, in FIG. 2, the CH$\phi$ input is coupled through an inverter 23 to NAND gate 22, the CH1 input is coupled through an inverter 25 to NAND gate 24 and the CHN input is coupled through an inverter 27 to NAND gate 26. The outputs of control logic circuit 20 correspond to the N outputs of its N NAND gates, one for each of the N output channels associated with the control logic circuit. Thus, the output of NAND gate 22 is the CH$\phi$ output of the control logic circuit, the output of NAND gate 24 is the CH1 output and the output of NAND gate 26 is the CHN output.

Decoder logic circuit 10 is coupled to control logic circuit 20 as follows (FIG. 2). The DN$\phi$ output of decoder 15 (and, conconsequently, of decoder logic circuit 10) is coupled to the DN$\phi$ input of control logic circuit 20. From above, the outputs DN$\phi$ to DN15 of decoder 15 correspond to the different peripheral units or devices in the data processing system. Since only one device, that associated with control logic circuit 20, is shown in FIGS. 1 and 2, only one of the outputs of decoder 15, i.e., output DN$\phi$, is relevant. However, the coupling of decoder 15, and, hence of decoder logic circuit 10, to other devices would be analogous. Control logic circuit 20 of device number DN$\phi$ is also coupled to N of the outputs of decoder 13 where N is the number of output channels associated with the control logic circuit. Thus, the CH$\phi$, CH1, . . . CHN outputs of decoder 13 (and, consequently, of decoder logic circuit 10) are coupled, respectively, to the CH$\phi$ CH1, . . . CHN inputs of control logic circuit 20.

The device number DN$\phi$ represented in FIG. 2 by control logic circuit 20 has a total of N analog output channels (from above, N=8). Only the output channel denominated CH$\phi$ in FIG. 1 is shown in FIG. 2. Each of the output channels is comprised of identical components; hence the ensuing discussion of output channel CH$\phi$ is applicable to all N output channels. From above, output channel CH$\phi$ comprises buffer latches 100, D/A latches 101 and D/A converter 102. In the preferred embodiment, buffer latches 100 and D/A latches 101 each comprise three 4-line latches. This gives a total of 12 data storage units for the channel, corresponding to the 12-bit data word of microprocessor 1. Thus, in FIG. 2, buffer latches 100 includes the 4-line latches 104, 106 and 108 while D/A latches 101 includes the 4-line latches 105, 107 and 109. The 4-line latches 104, 106 and 108 of buffer latches 100 are coupled in line to, respectively, the 4-line latches 105, 107 and 109 of D/A latches 101. The resulting 12 output lines of D/A latches 101 are, in turn, coupled to D/A converter 102.

To couple control logic circuit 20 to output channel CH$\phi$ the CH$\phi$ output of the control logic circuit, i.e., the output of NAND gate 22, is coupled to the enable inputs for the latches 104, 106 and 108 of buffer latches 100. Coupling control logic circuit 20 to the other N−1 N output channels would be analogous.

Data Bus 3 is coupled to output channel CH$\phi$ as follows. As noted above, the three 4-line latches of buffer latches 100 provide 12 data storage units. The 12 input lines of the three latches 104, 106 and 108 are denominated in FIG. 2 BD0, BD01, BD02, ... BD011. These inputs correspond to the 12 data lines of Data Bus 3. This, of course, permits the "latching" or storage of a 12-bit data word.

Finally, data clock line 50 is coupled to the enable inputs of each of the latches 105, 107 and 109 of D/A latches 101. This couples data clock line 50 to output channel CH$\phi$; again, the coupling to the other N−1 N output channels is analogous. Data clock line 50 can be controlled either by microprocessor 1 or externally.

In the preferred embodiment, the latches 12 and 14 in decoder logic circuit 10 and the latches which make up the buffer latches and the D/A latches in each of the N channels (latches 104, 106 and 108 in buffer latches 100 and latches 105, 107 and 109 in D/A latches 101) can each be any commercially available Quad (4-line), multiple flip-flop latch device for storing digital data. An example of an acceptable multiple flip-flop storage device is the SN74LS175 Quad D-type flip-flop manufactured by Texas Instruments Corp.

In the preferred embodiment, the decoders 13 and 15 (FIG. 2) can be any commercially available four-line to sixteen-line digital decoding device such as the MM74C154 manufactured by National Semiconductor.

In the preferred embodiment, the D/A converters associated with each of the N analog output channels can each be any commercially available device for converting digital inputs into an analog output voltage such as the MN370 manufactured by Micro Networks.

The mode of operation of the digital interface circuitry is as follows. Microprocessor 1 comprises microcomputer electronics, together with a set of programmed instructions, for receiving information in digital form, processing the information and storing the data in the computer memory. This data can then be retrieved, under software control, and routed to the proper output channel.

Transferring data from the computer memory of microprocessor 1 to the proper output channel involves two initiating steps, carried out in the microprocessor under software control. A 12-bit data word containing the information to be outputted is placed in Data Bus 3 and a 7-bit address word, indicating the particular device and output channel to which the 12-bit data word is to be routed, is placed in Address Bus 2.

When a 12-bit data word is assembled and placed in Data Bus 3, it also appears at the input lines to the buffer latches of each of the N output channels for each of the peripheral units or devices. Limiting the discussion, as was done above, to a single device (DN$\phi$), the buffer latches of the N output channels of this device are all initially disabled. The data is not stored, or latched, in the buffer latches of a particular output channel until an enabling pulse is supplied to the buffer latches of that particular output channel. The purpose of the 7-bit address word is to indicate which device and which of the N output channels of the device is to latch the data in Data Bus 3.

The 7-bit address word in Address Bus 2 appears at the 7-line input to decoder logic circuit 10. For the purposes of the ensuing discussion, and in accordance with the discussion of the preferred embodiment in conjunction with FIG. 2, the 7-bit address word is given as $\phi\phi\phi\phi\phi\phi\phi$. From above, this indicates that the 12-bit data word is to be routed to output channel CH$\phi$ of device number DN$\phi$. (Alternatively, the address word $\phi\phi\phi\phi\phi\phi$1 would indicate output channel CH1 of device number DN$\phi$, and so on.) The output channel code portion of the address word, i.e., bits $\phi$ to 2, appear at, respectively, latch input lines ADX$\phi$, ADX1 and ADX2 of latch 12. The device code portion of the address word, i.e., bits 3 to 6, appear at, respectively, latch input lines ADX3, ADX4, ADX5 and ADX6 of latch 14. A latching pulse from microprocessor 1 via clock line WRP enables each latch to latch its respective portion of the address word. The channel and device codes stored in, respectively, latches 12 and 14 appear at the respective decoders 13 and 15. All 16 of the output lines of decoder 13 and of decoder 15 are initially in the logic high state. In response to the output channel code $\phi\phi\phi$, decoder 13 selects the corresponding output line CH$\phi$ which switches to a logic low state. Correspondingly, in response to the device code DN$\phi$, decoder 15 selects the corresponding output line DN$\phi$ which switches to a logic low state. This output corresponds to the address word $\phi\phi\phi\phi\phi\phi\phi$ and indicates that output channel CH$\phi$ of device number DN$\phi$ is to be enabled.

As noted above, when the 12-bit data word is placed in Data Bus 3, it also appears at the input lines to the buffer latches of each of the N output channels of device number DN$\phi$. The function of control logic circuit 20 is, in accordance with the 7-bit address code, to enable the proper output channel, latching the data in that channel for eventual conversion to an analog output. The decoded address word appears at the output of decoder logic circuit 10 and, consequently, at the input of control logic circuit 20. Specifically, the DN$\phi$ and CH$\phi$ output lines of the decoder logic circuit are coupled to the DN$\phi$ and CH$\phi$ inputs of the control logic circuit. These inputs are coupled by inverters 23 and 28 to NAND gate 22. The inverted DN$\phi$ and CH$\phi$ inputs to NAND gate 22 are a logic high. When a clocking pulse from microprocessor 1 appears at the WRPA input to control logic circuit 20, and, consequently, at the third input to NAND gate 22, all inputs to NAND gate 22 are high. The output of NAND gate 22 then goes low until the WRPA clocking pulse terminates making the WRPA input to NAND gate 22 low and driving the NAND gate output high. This pulse output of NAND gate 22 is also the CH$\phi$ output of control logic circuit 20.

The CH$\phi$ pulse output of control circuit 20 appears at the enable input of each of the latches (104, 106 and 108) of buffer latches 100 in output channel CH$\phi$. This "latching" pulse enables each of the CH$\phi$ buffer latches, i.e., latches 104, 106, and 108, latching the 12-bit data word appearing at the 12 input lines of buffer latches 100.

The data word latched in the buffer latches of CH$\phi$ also appears at the twelve input lines of the D/A latches of CH$\phi$, i.e., the latches 105, 107 and 109 of D/A latches 101. However, the D/A latches 100 are not enabled by data clock line 50 until all N output controls of device DN$\phi$ are loaded. Subsequent address words, each embodying a device number code and a channel number code, are placed in Address Bus 2 while corresponding 12-bit data words are placed in Data Bus 3. These subsequent address codes control the sequential enabling of the buffer latches associated with the remaining output channels and latching of the respective 12-bit data words.

When the N output channels are loaded, i.e., when N data words are each latched in the buffer latches of a respective output channel, data clock line 50 is pulsed. Data clock line 50 can be pulsed either under the control of microprocessor 1 or under an external control mechanism. This enables each of the D/A latches of the N output channels, latching a respective 12-bit data word. Representatively, in the case of output channel CH$\phi$, the latching pulse from data clock line 50 enables the latches 105, 107 and 109 of D/A latches 101. The 12-bit data word appearing at the 12 line input to D/A latches 101 is latched, and appears at the 12 line input to D/A converter 102. D/A converter 102 converts the inputted 12-bit data word into an analog voltage which is the analog output for output channel CH$\phi$ of device number DN$\phi$.

From the above description of the preferred embodiment it is apparent that disclosed is digital interface circuitry for obtaining simultaneous, multi-channel analog outputs from a microprocessor, avoiding sequential addressing delays.

Obviously, other embodiments and modifications of the present invention will readily come to those of ordinary skill in the art having the benefit of the teachings presented in the foregoing description and the drawings. It is therefore, to be understood that this invention is not to be limited thereto and that said modifications and embodiments are intended to be included within the scope of the appended claims. For instance, the digital interface circuitry according to the present invention is completely adaptible to any type of digital processing unit. This would include digital processing units ranging in size from a large main frame (IBM, CDC, etc.) to a mini-computer (DEC, DG, etc.) to a microprocessor (Intel, T.I., etc.) or to any special purpose digital processing unit.

What is claimed and desired to be secured by Letters Patent of the United States is:

1. In a data processing system comprising a digital processing unit, having an address bus output for a multi-bit address word and a data bus output for a multi-bit data word, and a plurality of digital-to-analog (D/A) converters, wherein a plurality of said data words are sequentially routed, one to each of said plurality of D/A converters, with a particular data word being routed to the D/A converter indicated by a corresponding, unique address word; a digital interface circuit for coupling said digital processing unit to said plurality of digital-to-analog converters while minimizing processing delays, whereby simultaneous, synchronous, multi-channel analog outputs are obtained from said digital processing unit; said digital interface circuit comprising:

a plurality of D/A latching means for storing a single, multi-bit data word, each having a data input, a data output coupled to one of said plurality of D/A converters, and an enabling input, whereby, when and only when an enabling pulse is given to said enabling input, a data word appearing at said data input will be stored in, and will appear at said data output of, each of said D/A latching means;

a plurality of buffer latching means for storing a single, multi-bit data word, each having a data input coupled to said data output bus, a data output coupled to said data input of one of said plurality of D/A latching means, and an enabling input, whereby, when and only when an enabling pulse is given to said enabling input, a data word appearing at said data input will be stored in, and will appear at said data output of, each of said buffer latching means;

control logic means coupled to said enabling input of each of said plurality of buffer latching means, said control logic means comprising a number of NAND gates equal to or greater than the number of D/A converters, the output of said NAND gates comprising the outputs of said control logic means, with the output of a particular NAND gate being coupled to the enabling input of the corresponding buffer latching means;

decoder logic means coupled between said control logic means and said address bus output, said decoder means comprising at least one decoder device having a number of outputs equal to or greater than the number of said D/A converters, each of said decoder outputs being coupled to a corresponding input of one of said NAND gates; and external clock means coupled to said enabling input of each of said plurality of D/A latching means for generating clock pulses having a period between pulses greater than the processing time of said digital processing unit, whereby said digital processing unit, said plurality of D/A converters, and any of a plurality of peripheral devices coupled to said digital processing unit may be synchronized while minimizing processing delays in said digital processing unit;

said decoder logic means selecting, for a particular address word, the one of its outputs coupled to one of said NAND gates associated with the particular D/A converter of said plurality of D/A converters which corresponds to that address word, whereby the output of said NAND gate will be an enabling pulse;

said control logic means transmitting an enabling pulse to said enabling input of the particular one of said plurality of buffer latching means associated with the particular D/A converter indicated by the output of said decoder logic; thereby enabling the particular buffer latching means and, concomitantly, storing the particular data word, of said plurality of data words, appearing at the data input of the particular buffer latching means;

said external clock means, after the sequential storing of said plurality of said data words in the appropriate one of said plurality of buffer latching means, transmitting an enabling latching pulse to said enabling input of each of said D/A latching means; thereby, for each of said plurality of D/A latching means, simultaneously and synchronously enabling the D/A latching means, and, concomitantly, storing the data word appearing in the particular buffer latching means coupled to the D/A latching means, whereby each of said plurality of data words appears simultaneously and synchronously at the corresponding one of said plurality of D/A converters.

* * * * *